United States Patent
Mongillo et al.

(10) Patent No.: US 10,570,746 B2
(45) Date of Patent: Feb. 25, 2020

(54) GAS TURBINE ENGINE COMPONENT HAVING VASCULAR ENGINEERED LATTICE STRUCTURE

(71) Applicant: UNITED TECHNOLOGIES CORPORATION, Hartford, CT (US)

(72) Inventors: Dominic J. Mongillo, West Hartford, CT (US); Tracy A. Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 846 days.

(21) Appl. No.: 14/655,058

(22) PCT Filed: May 15, 2013

(86) PCT No.: PCT/US2013/041054
§ 371 (c)(1),
(2) Date: Jun. 24, 2015

(87) PCT Pub. No.: WO2014/105113
PCT Pub. Date: Jul. 3, 2014

(65) Prior Publication Data
US 2015/0345298 A1    Dec. 3, 2015

Related U.S. Application Data

(63) Continuation-in-part of application No. PCT/US2013/032202, filed on Mar. 15, 2013.
(Continued)

(51) Int. Cl.
*F01D 5/18* (2006.01)
*F01D 11/08* (2006.01)
(Continued)

(52) U.S. Cl.
CPC ............ *F01D 5/186* (2013.01); *B22F 3/1055* (2013.01); *B23P 15/26* (2013.01); *F01D 5/147* (2013.01);
(Continued)

(58) Field of Classification Search
CPC . F02C 7/18; F01D 5/186; F01D 5/187; F01D 5/18; F01D 5/147; F01D 25/12; F05D 2260/204; F05D 2260/221
See application file for complete search history.

(56) References Cited

U.S. PATENT DOCUMENTS

| | | | |
|---|---|---|---|
| 3,584,972 | A | 6/1971 | Bratkovich et al. |
| 3,864,199 | A | 2/1975 | Meginnis |
| 3,900,629 | A | 8/1975 | Spencer |
| 4,004,056 | A | 1/1977 | Carroll |
| 4,091,146 | A | 5/1978 | Darrow et al. |
| 4,168,348 | A | 9/1979 | Bhangu et al. |

(Continued)

FOREIGN PATENT DOCUMENTS

| | | |
|---|---|---|
| DE | 10261071 A1 | 7/2004 |
| EP | 0475658 A1 | 3/1992 |

(Continued)

OTHER PUBLICATIONS

International Preliminary Report on Patentability for PCT Application for PCT/US2013/0141054, dated Jul. 9, 2015.

(Continued)

*Primary Examiner* — Andrew H Nguyen
(74) *Attorney, Agent, or Firm* — Carlson, Gaskey & Olds, PC.

(57) ABSTRACT

A component according to an exemplary aspect of the present disclosure includes, among other things, a wall and a vascular engineered lattice structure formed inside of the wall. The vascular engineered lattice structure includes at least one of a hollow vascular structure and a solid vascular structure configured to communicate fluid through the vascular engineered lattice structure.

23 Claims, 5 Drawing Sheets

Related U.S. Application Data

(60) Provisional application No. 61/746,893, filed on Dec. 28, 2012, provisional application No. 61/757,441, filed on Jan. 28, 2013.

(51) Int. Cl.
| | |
|---|---|
| *F01D 25/24* | (2006.01) |
| *F02C 7/18* | (2006.01) |
| *F01D 25/12* | (2006.01) |
| *B22F 3/105* | (2006.01) |
| *B23P 15/26* | (2006.01) |
| *F01D 5/14* | (2006.01) |
| *F01D 9/02* | (2006.01) |
| *F01D 25/08* | (2006.01) |
| *B33Y 10/00* | (2015.01) |
| *B33Y 70/00* | (2020.01) |
| *B33Y 80/00* | (2015.01) |

(52) U.S. Cl.
CPC ............. *F01D 5/18* (2013.01); *F01D 5/187* (2013.01); *F01D 9/02* (2013.01); *F01D 11/08* (2013.01); *F01D 25/08* (2013.01); *F01D 25/12* (2013.01); *F01D 25/24* (2013.01); *F02C 7/18* (2013.01); *B33Y 10/00* (2014.12); *B33Y 70/00* (2014.12); *B33Y 80/00* (2014.12); *F05D 2260/204* (2013.01); *F23R 2900/03043* (2013.01); *Y10T 29/49318* (2015.01); *Y10T 29/49337* (2015.01); *Y10T 29/49343* (2015.01); *Y10T 29/49352* (2015.01); *Y10T 428/249921* (2015.04)

(56) References Cited

U.S. PATENT DOCUMENTS

| | | |
|---|---|---|
| 4,269,032 A | 5/1981 | Meginnis et al. |
| 4,292,376 A | 9/1981 | Hustler |
| 4,302,940 A | 12/1981 | Meginnis |
| 4,359,181 A | 11/1982 | Chisholm |
| 4,407,632 A | 10/1983 | Liang |
| 4,440,834 A | 4/1984 | Aubert et al. |
| 4,751,962 A | 6/1988 | Havekost et al. |
| 5,193,611 A | 3/1993 | Hesselgreaves |
| 5,353,867 A | 10/1994 | Jaspers |
| 5,370,499 A | 12/1994 | Lee |
| 5,545,003 A | 8/1996 | O'Connor et al. |
| 5,607,778 A | 3/1997 | Padden |
| 5,660,523 A | 8/1997 | Lee |
| 5,752,801 A | 5/1998 | Kennedy |
| 5,960,863 A | 10/1999 | Hua |
| 5,975,841 A | 11/1999 | Lindemuth et al. |
| 6,126,396 A | 10/2000 | Doughty et al. |
| 6,167,952 B1 | 1/2001 | Downing |
| 6,235,370 B1 | 5/2001 | Merrill et al. |
| 6,397,922 B1 | 6/2002 | Sachs et al. |
| 6,412,541 B2 | 7/2002 | Roesler |
| 6,508,623 B1 | 1/2003 | Shiozaki et al. |
| 6,511,762 B1 | 1/2003 | Lee et al. |
| 6,599,568 B2 | 7/2003 | Lee et al. |
| 6,617,003 B1 | 9/2003 | Lee et al. |
| 6,629,559 B2 | 10/2003 | Sachs et al. |
| 6,761,956 B2 | 7/2004 | Lee et al. |
| 6,955,523 B2 | 10/2005 | McClelland |
| 7,048,986 B2 | 5/2006 | Shah et al. |
| 7,063,131 B2 | 6/2006 | Northrop |
| 7,070,853 B2 | 7/2006 | Paul |
| 7,141,812 B2 | 11/2006 | Appleby |
| 7,144,220 B2 | 12/2006 | Marcin |
| 7,153,464 B2 | 12/2006 | Millard et al. |
| 7,204,089 B2 | 4/2007 | Schreiber |
| 7,294,164 B2 | 11/2007 | Merkel |
| 7,328,580 B2 | 2/2008 | Lee et al. |
| 7,402,335 B2 | 7/2008 | Bolms et al. |
| 7,500,828 B2 | 3/2009 | Landis |
| 7,540,710 B2 | 6/2009 | Grote et al. |
| 7,597,533 B1 | 10/2009 | Liang |
| 7,658,590 B1 | 2/2010 | Spanks |
| 7,665,956 B2 | 2/2010 | Mitchell et al. |
| 7,670,675 B2 | 3/2010 | Heselhaus |
| 7,717,677 B1 | 5/2010 | Liang |
| 7,775,766 B2 | 8/2010 | Meier et al. |
| 7,785,098 B1 | 8/2010 | Appleby et al. |
| 7,810,552 B2 | 10/2010 | Slaughter |
| 7,866,372 B2 | 1/2011 | Slaughter |
| 7,866,377 B2 | 1/2011 | Slaughter |
| 7,968,144 B2 | 6/2011 | James et al. |
| 8,052,389 B2 | 11/2011 | Kopmels |
| 8,079,821 B2 * | 12/2011 | Campbell ............... F01D 5/147 415/115 |
| 8,167,573 B2 | 5/2012 | Merrill et al. |
| 8,257,809 B2 | 9/2012 | Morrison et al. |
| 8,327,911 B2 | 12/2012 | Kush et al. |
| 2005/0045306 A1 | 3/2005 | Petervary et al. |
| 2005/0111980 A1* | 5/2005 | Negulescu ............. F01D 5/081 416/97 R |
| 2006/0099074 A1 | 5/2006 | Kopmels |
| 2006/0251515 A1 | 11/2006 | Landis |
| 2006/0285975 A1 | 12/2006 | Landis |
| 2007/0031252 A1 | 2/2007 | Walters et al. |
| 2007/0214759 A1 | 9/2007 | Merkel |
| 2007/0243069 A1 | 10/2007 | Read |
| 2007/0275210 A1 | 11/2007 | Heselhaus |
| 2008/0080979 A1* | 4/2008 | Brassfield ............... B22C 9/043 416/97 R |
| 2008/0254276 A1 | 10/2008 | James |
| 2009/0011919 A1 | 1/2009 | Noguchi et al. |
| 2009/0274549 A1* | 11/2009 | Mitchell ................. F01D 5/182 415/115 |
| 2010/0011775 A1* | 1/2010 | Garry ....................... C23C 4/02 60/752 |
| 2010/0025001 A1* | 2/2010 | Lee ............................ B22C 7/02 164/23 |
| 2010/0119377 A1* | 5/2010 | Tibbott ................... F01D 5/186 416/97 R |
| 2010/0284798 A1 | 11/2010 | Campbell et al. |
| 2010/0291401 A1 | 11/2010 | Medina et al. |
| 2011/0052412 A1* | 3/2011 | Ader ...................... B22F 3/1055 416/97 R |
| 2011/0180245 A1 | 7/2011 | Obana et al. |
| 2011/0262695 A1* | 10/2011 | Lee ......................... F01D 5/182 428/131 |
| 2011/0265406 A1 | 11/2011 | Morrison et al. |
| 2011/0268580 A1 | 11/2011 | Bryk et al. |
| 2011/0293434 A1 | 12/2011 | Lee et al. |
| 2012/0006518 A1 | 1/2012 | Lee et al. |
| 2012/0034075 A1 | 2/2012 | Hsu et al. |
| 2012/0070306 A1 | 3/2012 | Lee et al. |
| 2012/0237786 A1 | 9/2012 | Morrison et al. |
| 2012/0243970 A1 | 9/2012 | Hellgren et al. |
| 2012/0291991 A1 | 11/2012 | Denkenberger |
| 2013/0001837 A1 | 1/2013 | Gohler et al. |

FOREIGN PATENT DOCUMENTS

| | | |
|---|---|---|
| EP | 0896127 B1 | 7/2007 |
| EP | 2199725 A1 | 6/2010 |
| GB | 2284825 A | 6/1995 |
| WO | 2003006883 A1 | 1/2003 |
| WO | 2007014005 A1 | 2/2007 |
| WO | 2011069015 A2 | 6/2011 |
| WO | 2011133359 A1 | 10/2011 |
| WO | 2013013995 A1 | 1/2013 |

OTHER PUBLICATIONS

International Search Report and Written Opinion of the International Searching Authority for International application No. PCT/US2013/032003 dated Dec. 17, 2013.

International Search Report and Written Opinion of the International Searching Authority for International application No. PCT/US2013/032202 dated Jan. 27, 2014.

(56) References Cited

OTHER PUBLICATIONS

International Search Report and Written Opinion of the International Searching Authority for International application No. PCT/US2013/041054 dated Sep. 4, 2013.
Extended European Search Report for Application No. EP 13 86 7031 dated Jul. 15, 2016.
Extended European Search Report for Application No. EP 13 86 9611 dated Jul. 21, 2016.
European Search Report for European Patent Application No. 18201643.6 completed Feb. 14, 2019.

* cited by examiner

GAS TURBINE ENGINE COMPONENT HAVING VASCULAR ENGINEERED LATTICE STRUCTURE

CROSS-REFERENCE TO RELATED APPLICATION

This application is a Continuation-in-Part of PCT/US2013/032202, filed on Mar. 15, 2013, which claims priority to U.S. Provisional Application No. 61/746,893, which was filed on Dec. 28, 2012, and claims priority to U.S. Provisional Application No. 61/757,441, which was filed on Jan. 28, 2013.

BACKGROUND

This disclosure relates to a gas turbine engine, and more particularly to a gas turbine engine component having a vascular engineered lattice structure.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of a gas turbine engine may include cooling schemes that circulate airflow to cool the component during engine operation. Thermal energy is transferred from the component to the airflow as the airflow circulates through the cooling scheme to cool the component. Known cooling schemes may be inefficient and lack structural integrity.

SUMMARY

A component according to an exemplary aspect of the present disclosure includes, among other things, a wall and a vascular engineered lattice structure formed inside of the wall. The vascular engineered lattice structure includes at least one of a hollow vascular structure and a solid vascular structure configured to communicate fluid through the vascular engineered lattice structure.

In a further non-limiting embodiment of the foregoing component, the vascular engineered lattice structure is a hollow vascular structure in which the airflow is communicated inside hollow passages of one or more nodes and branches of the vascular engineered lattice structure.

In a further non-limiting embodiment of either of the foregoing components, the vascular engineered lattice structure is a solid structure in which the fluid is communicated around and over one or more nodes and branches of the vascular engineered lattice structure.

In a further non-limiting embodiment of any of the foregoing components, the wall is part of an airfoil, a blade, a vane, a blade outer air seal (BOAS), a combustor panel or a turbine exhaust case of a gas turbine engine.

In a further non-limiting embodiment of any of the foregoing components, the vascular engineered lattice structure is a co-flow vascular engineered lattice structure or a counter-flow vascular engineered lattice structure.

In a further non-limiting embodiment of any of the foregoing components, the vascular engineered lattice structure is formed using an additive manufacturing process.

In a further non-limiting embodiment of any of the foregoing components, the vascular engineered lattice structure is a curved or arcuate structure disposed in a leading edge of the component.

In a further non-limiting embodiment of any of the foregoing components, the vascular engineered lattice structure is an axial jumper vascular engineered lattice structure.

In a further non-limiting embodiment of any of the foregoing components, the vascular engineered lattice structure is a radial flow vascular engineered lattice structure.

In a further non-limiting embodiment of any of the foregoing components, the vascular engineered lattice structure is axially and radially tapered.

In a further non-limiting embodiment of any of the foregoing components, a height of the vascular engineered lattice structure is tapered in a streamwise direction.

In a further non-limiting embodiment of any of the foregoing components, the vascular engineered lattice structure includes at least two separate axial flow vascular engineered lattice structures.

A method for producing a component according to another exemplary aspect of the present disclosure includes, among other things, the steps of forming a vascular engineered lattice structure inside of a wall of the component, the vascular engineered lattice structure having at least one of a hollow lattice structure and a solid lattice structure.

In a further non-limiting embodiment of the foregoing method, the step of forming the vascular engineered lattice structure includes utilizing direct metal laser sintering (DMLS).

In a further non-limiting embodiment of either of the foregoing methods, the step of forming the vascular engineered lattice structure includes utilizing electron beam melting (EBM).

In a further non-limiting embodiment of any of the foregoing methods, the step of forming the vascular engineered lattice structure includes utilizing select laser sintering (SLS).

In a further non-limiting embodiment of any of the foregoing methods, the step of forming the vascular engineered lattice structure includes utilizing select laser melting (SLM).

In a further non-limiting embodiment of any of the foregoing methods, the method comprises the step of communicating a fluid inside of passages of one or more nodes and branches of the vascular engineered lattice structure where the vascular engineered lattice structure embodies the hollow lattice structure, or communicating the fluid around and over the one or more nodes and branches of the vascular engineered lattice structure where the vascular engineered lattice structure embodies the solid lattice structure.

In a further non-limiting embodiment of any of the foregoing methods, the step of forming the vascular engineered lattice structure includes forming a core using an additive manufacturing process and using the core to cast the vascular engineered lattice structure.

In a further non-limiting embodiment of any of the foregoing methods, the additive manufacturing process includes powder bed technology and the vascular engineered lattice structure is cast using a lost wax process.

A component according to another exemplary aspect of this disclosure includes a vascular engineered lattice structure formed inside of the component. The vascular engineered lattice structure includes at least one of a hollow vascular structure and a solid vascular structure.

The various features and advantages of this disclosure will become apparent to those skilled in the art from the following detailed description. The drawings that accompany the detailed description can be briefly described as follows.

DETAILED DESCRIPTION

Figure 1:
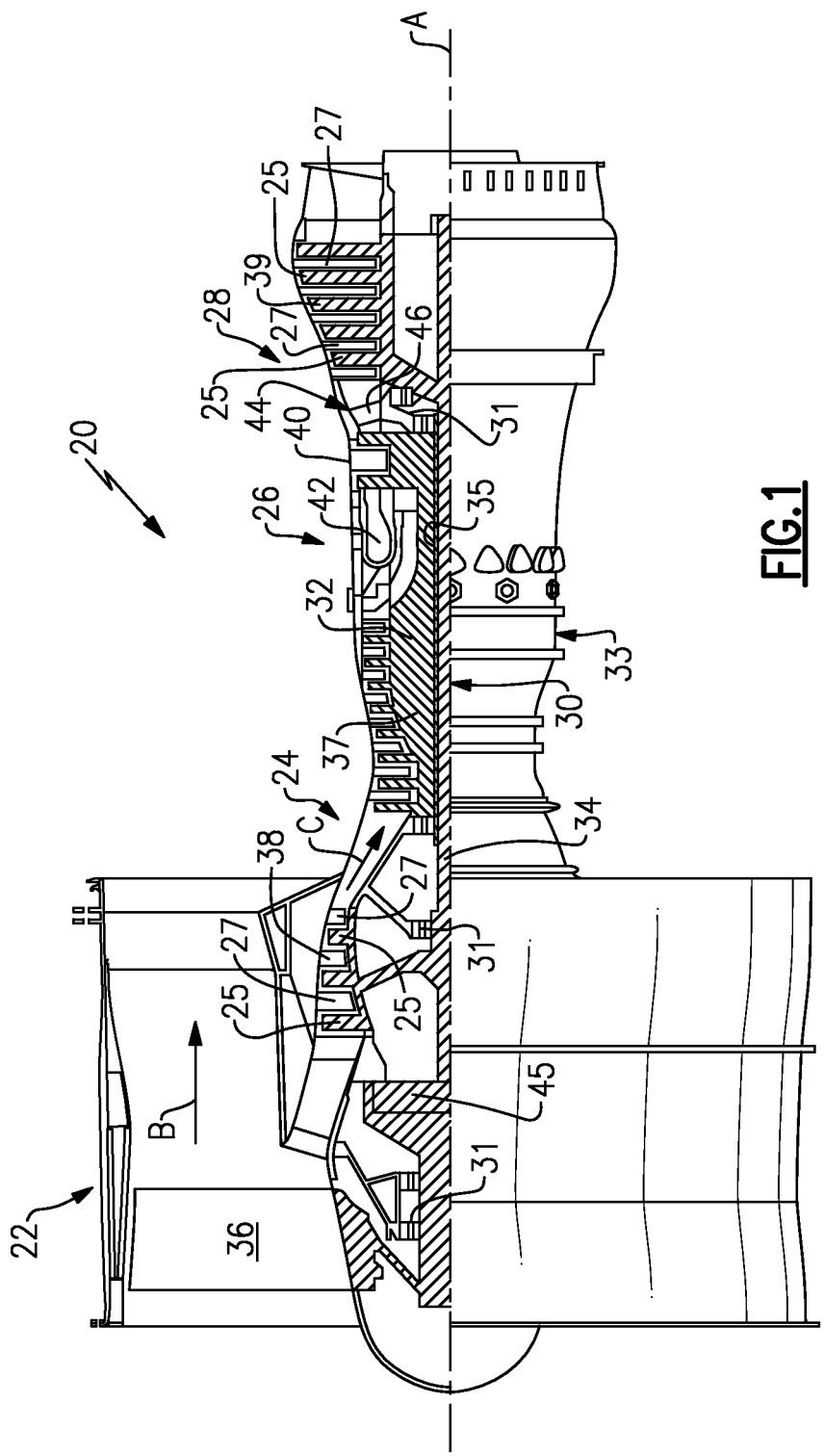
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°\ R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling schemes for cooling the parts during engine operation.

Among other features, this disclosure relates to gas turbine engine component cooling schemes that include vascular engineered lattice structures inside the walls of the gas turbine engine component. The exemplary structures described herein provide effective localized convective cooling for gas turbine engine components that may be subject to the hot combustion gases that are communicated through the core flow path C.

Figure 2:
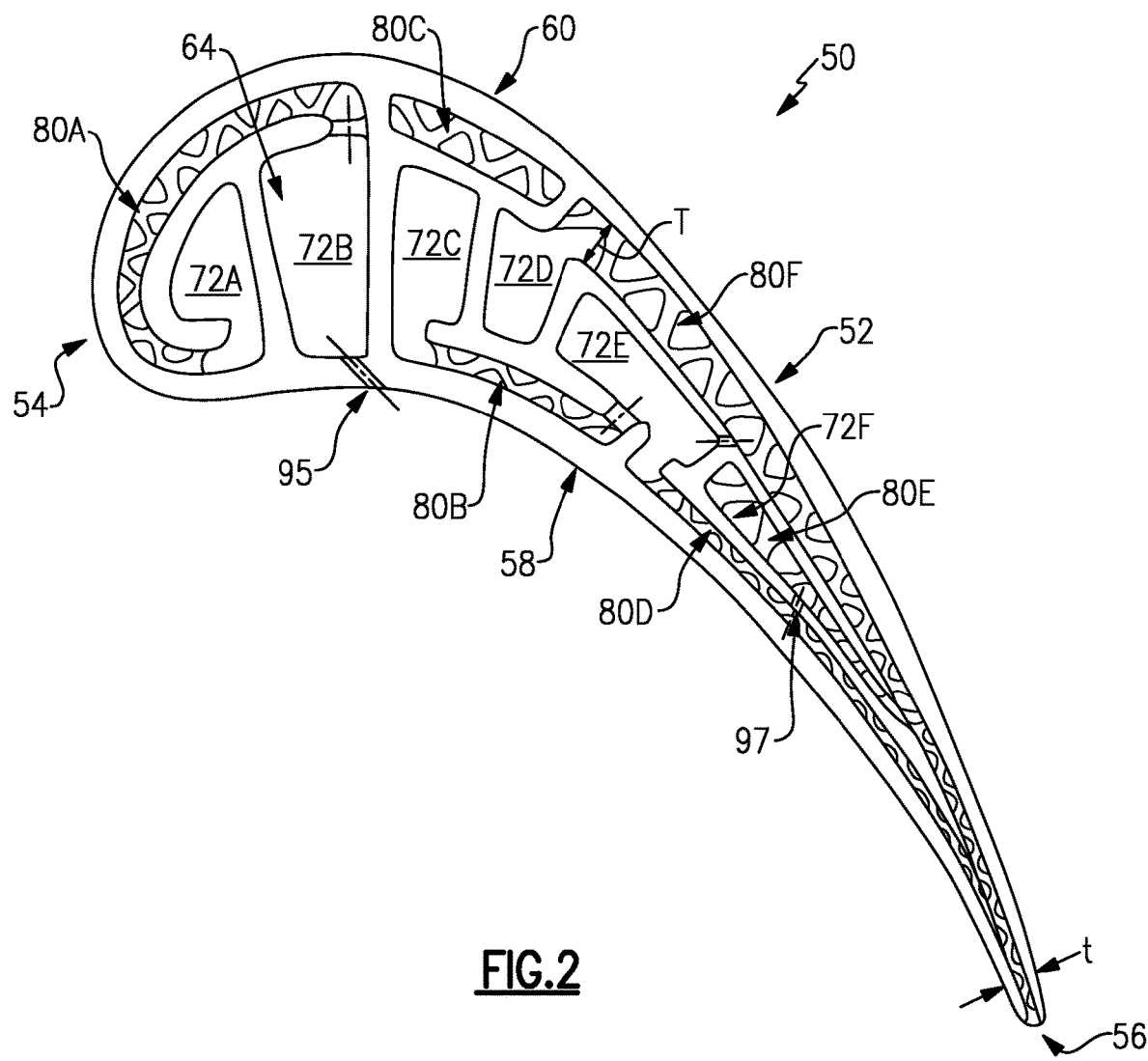
FIG. 2 illustrates a component that can be incorporated into a gas turbine engine.

FIG. 2 illustrates a component 50 that can be incorporated into a gas turbine engine, such as the gas turbine engine 20 of FIG. 1. The component 50 includes a body portion 52 that axially extends between a leading edge portion 54 and a trailing edge portion 56. The body portion 52 may further include a first (pressure) side wall 58 and a second (suction) side wall 60 that are spaced apart from one another and axially extend between the leading edge portion 54 and the trailing edge portion 56. Although shown in cross-section, the body portion 52 would also extend radially across a span.

In this embodiment, the body portion 52 is representative of an airfoil. For example, the body portion 52 could be an airfoil that extends from platform and root portions (i.e., where the component is a blade), or could alternatively extend between inner and outer platforms (i.e., where the component 50 is a vane). In yet another embodiment, the component 50 could include a non-airfoil component, including but not limited to, a blade outer air seal (BOAS), a combustor liner, a turbine exhaust case liner, or any other part that may require dedicated cooling.

A cooling scheme 64 may be disposed inside of the body portion 52 for cooling the internal and external surface areas of the component 50. For example, the cooling scheme 64 can include one or more cavities 72 (here, cavities 72A through 72F) that may radially, axially and/or circumferentially extend inside of the body portion 52 to establish cooling passages for receiving an airflow (or some other fluid). Of course, the component 50 could include greater or fewer cavities than are shown in FIG. 2.

The exemplary cooling scheme 64 may additionally include one or more vascular engineered lattice structures 80 (here, vascular engineered lattice structures 80A through 80F) that are disposed inside sections of the body portion 52 of the component 50. Of course, the component 50 could include greater or fewer vascular engineered lattice structures than are shown in FIG. 2. Discrete portions of the component 50 may embody a vascular engineered lattice structure, or the entire component 50 can be constructed of a vascular engineered lattice structure. Multiple non-limiting embodiments of such vascular engineered lattice structures are described in detail below.

The component 50 of FIG. 2 is illustrated in cross-section and can include multiple applications of pure convective vascular cooling design concepts. In one embodiment, the leading edge portion 54 of the component 50 is convectively cooled with a curved or arcuate "hollow" or "solid" vascular engineered lattice structure 80A. In this embodiment, cooling air is fed from a high pressure source, such as from the cavity 72A, and is fed into the vascular engineered lattice structure 80A and then discharged through one or more orifices which can be designed of any shape and size depending on thermal and/or cooling flow requirements. The reduced (lower) pressure in the cavity 72B can be achieved by metering the cooling air at inlet using a metering plate device and/or manufactured feature (not shown) and then purged by introducing one or more film cooling holes 95 through the first side wall 58. Film cooling hole geometries of any type and shape can be used to achieve required local thermal cooling effectiveness levels necessary to minimize local high external heat flux to achieve life goals.

A convectively cooled axial "Jumper" configuration that includes a vascular lattice network (created using any additive manufacturing process, for example) fed from a high pressure cavity and purged into a lower pressure cavity can also be employed along the first side wall 58 and/or along the second side wall 60 in order to maximize local convective cooling. One such pressure side lattice "Jumper" vascular engineered lattice structure 80B is fed with cooling air from a relatively high pressure source cavity 72C through the "Jumper" vascular engineered lattice structure 80B and expelled/discharged through one or more orifices which can be designed of any shape and size that extend to another cavity 72E. The axial "Jumper" vascular engineered lattice structure 80B can be employed either along the entire airfoil radial span of the component 50 and/or at local discrete radial locations where required.

Another vascular engineered lattice structure 80C can also be incorporated in which the cooling air flows radially in the span-wise direction. An airflow source can be located at either the ID (root) or the OD (tip) location of the component 50 depending upon the application. In this particular embodiment, the radial flow vascular engineered lattice structure 80C is supplied with cooling air from an airfoil supply inlet (not shown). Similar to the axial flow "Jumper" vascular engineered lattice structure 80B, the radial flow vascular engineered lattice structure 80C can extend either along the entire radial span and/or can begin and end at local discrete radial locations depending on design considerations. The vascular engineered lattice structure 80C can also be tapered in either/or both the axial and radial directions along the airfoil span to better manage convective heat transfer, pressure loss, and cooling air heat pickup, depending on design considerations.

Another type of purely convectively cooled axial vascular engineered lattice structure design involves feeding an axially tapered vascular engineered lattice structure 80D. In addition to the axial taper, the vascular engineered lattice structure 80D structure may also be tapered in the radial direction to manage internal convective heat transfer, pressure loss, and cooling air heat pickup requirements. In this particular design, the vascular engineered lattice structure 80D is fed with a moderate pressure source supplied from the cavity 72E and discharged at the trailing edge portion 56. As a result of the axial length of the vascular engineered lattice structure 80D, it may be necessary to ensure the required local convective cooling is sufficient to address locally high external heat load that results on the aft portion of the first side wall 58.

In order to mitigate excessive internal cooling air heat pick up associated with high convective heat transfer vascular engineered lattice structures, it may be necessary to "resupply" the convective circuit with lower temperature coolant flow. In FIG. 2, the vascular engineered lattice structure 80D is resupplied at orifice 97 at position along the length of the cavity 72F. The location and quantity of coolant resupply can be designed of any shape and size depending on local thermal and cooling flow requirements of the component 50. Additionally, the cavity 72F may contain a vascular engineered lattice structure 80E within itself to create a low pressure environment therein that is radially flowing in nature. However, the cavity 72F could alternatively be fed from the cavity 72E, which may have a medium pressured environment.

In addition, the component 50 could be designed to include several design options that mitigate design concerns associated with excessive cooling air heat pick up in relatively long axial flowing vascular engineered lattice structure. In addition to tailoring the axial and radial density distribution of the vascular engineered lattice structure, another effective design attribute is to taper the vascular channel height in the streamwise direction. For example, as illustrated in FIG. 2, an axial flowing vascular engineered lattice structure 80F is shown adjacent to the second side wall 60 with cooling air supplied by the cavity 72D. In one embodiment, a thickness T of the vascular engineered lattice structure 80F is tapered. For example, the vascular engineered lattice structure 80F may include one thickness T at the inlet coolant supply location emanating from the cavity 72D and then taper in the streamwise direction to a smaller thickness t at the trailing edge portion 56. The vascular engineered lattice structure 80F can also be resupplied with lower temperature coolant by both a moderate pressure source from the cavity 72E and a lower pressure source form the cavity 72F.

The vascular engineered lattice structures 80D and 80F, which are discharged at the trailing edge portion 56, may be kept separate to ensure that there is no internal flow communication occurring between the two segments. Keeping the vascular engineered lattice structures 80D and 80E separate maintains any pressure differential between the two segments and improves tailoring of the internal convective cooling and flow requirements for the aft portions of the first side wall 58 and the second side wall 60 as well as the trailing edge portion 56.

Figure 3:
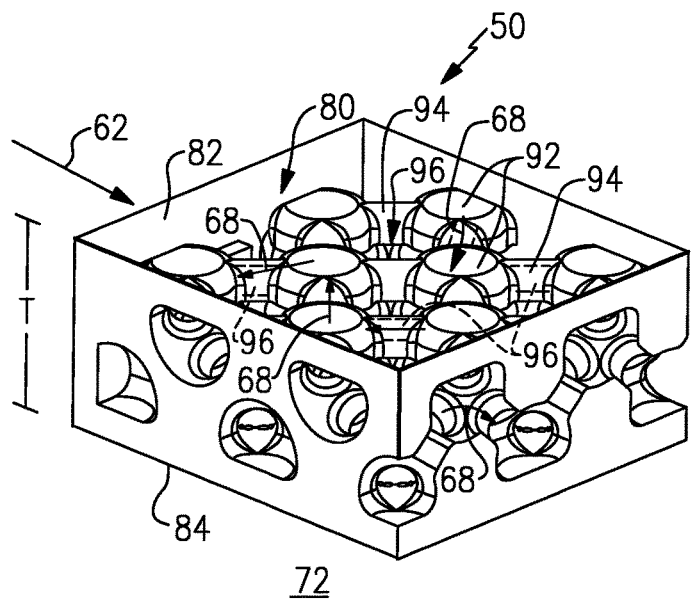
FIG. 3 shows one exemplary vascular engineered lattice structure of a gas turbine engine component.
Figure 4:
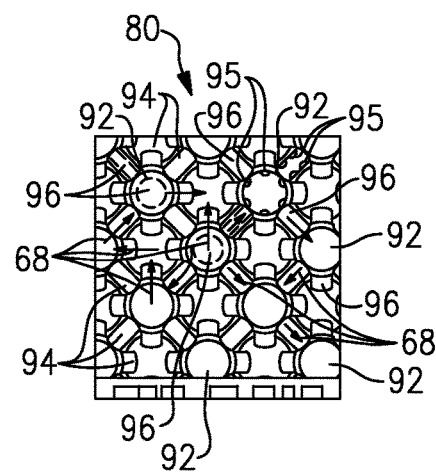
FIG. 4 illustrates another view of the vascular engineered lattice structure of FIG. 3.

FIGS. 3 and 4 illustrate one exemplary vascular engineered lattice structure 80 that can be incorporated into a component 50. The vascular engineered lattice structure 80 may be incorporated into any section or sections of a gas turbine engine component. In this disclosure, the term "vascular engineered lattice structure" denotes a structure of known surface and flow areas that includes a specific structural integrity. It should be appreciated that the vascular engineered lattice structures described herein are not limited to uses involving cooling schemes. For example, in one non-limiting embodiment, the vascular engineered lattice structures may be incorporated into a compressor airfoil as a weight reduction measure.

As discussed in greater detail below, the vascular engineered lattice structure 80 of FIGS. 3 and 4 is a hollow vascular structure. The hollow vascular structure shown in FIGS. 3 and 4 defines a solid material with discrete, interconnected cooling passages that are connected through common nodes to control the flow of airflow throughout the hollow vascular structure.

The specific design and configuration of the vascular engineered lattice structure 80 of FIG. 3 is not intended to limiting. It will be appreciated that because the vascular engineered lattice structure 80 is an engineered structure, the vascular arrangement of these structures can be tailored to the specific cooling and structural needs of any given gas turbine engine component. In other words, the vascular engineered lattice structure 80 can be tailored to match external heat load and local life requirements by changing the design and density of the vascular engineered lattice structure 80. The actual design of any given vascular engineered lattice structure may depend on geometry requirements, pressure loss, local cooling flow, cooling air heat pickup, thermal efficiency, overall cooling effectiveness, aerodynamic mixing, and produceability considerations, among other gas turbine engine specific parameters. In one embodiment, the vascular engineered lattice structure 80 is sized based on a minimum size that can be effectively manufactured and that is not susceptible to becoming plugged by dirt or other debris.

The exemplary vascular engineered lattice structure 80 extends between a first wall 82 and a second wall 84 of the component 50. The first wall 82 is spaced from the first wall 82. The first wall 82 may be exposed to a gas path 62, whereas the second wall 84 may be remotely positioned from the gas path 62. For example, the second wall 84 could face into one of the cooling source cavities 72 of the cooling scheme 64 (see FIG. 2). The vascular engineered lattice structure 80 includes a thickness T between the first wall 82 and the second wall 84. The thickness T can be of any dimension.

Airflow 68 filters through the vascular engineered lattice structure 80 to convectively cool the component 50. In this disclosure, the term "through" is defined to include either inside of or around the vascular surfaces of the vascular engineered lattice structure. In one embodiment, the vascular engineered lattice structure 80 embodies a hollow configuration in which the airflow 68 may be circulated inside of the various passages defined by the vascular engineered lattice structure 80. For example, the hollow configuration of the vascular engineered lattice structure 80 may establish a porous flow area for the circulation of airflow 68. Additionally, airflow 68 could be communicated over and around the vascular engineered lattice structure 80.

The vascular engineered lattice structure 80 can be manufactured by using a variety of manufacturing techniques. For example, the vascular engineered lattice structure 80 may be created using an additive manufacturing process such as direct metal laser sintering (DMLS). Another additive manufacturing process that can be used to manufacture the vascular engineered lattice structure 80 is electron beam melting (EBM). In another embodiment, select laser sintering (SLS) or select laser melting (SLM) processes may be utilized.

In yet another embodiment, a casting process can be used to create the vascular engineered lattice structure 80. For example, an additive manufacturing process can be used to produce a refractory metal core (RMC), including but not limited to a molybdenum core, that can be used to cast the vascular engineered lattice structure 80. In one embodiment, the additive manufacturing process includes utilizing a powder bed technology and the casting process includes a lost wax process.

The exemplary vascular engineered lattice structure 80 includes a plurality of nodes 92, a plurality of branches 94 that extend between the nodes 92, and a plurality of hollow passages 96 between the branches 94 and the nodes 92. The number, size and distribution of nodes 92, branches 94 and hollow passages 96 can vary from the specific configuration shown. In other words, the configuration illustrated by FIG. 4 is but one possible design.

The branches 94 may extend orthogonally or non-orthogonally to the nodes 92. The nodes 92 and branches 94 can be manufactured as a single contiguous structure made of the same material. In one embodiment, the nodes 92 and branches 94 are uniformly distributed throughout the vascular engineered lattice structure 80. In another embodiment, the nodes 92 and branches 94 are non-uniformly distributed throughout the vascular engineered lattice structure 80.

In this "hollow lattice" structure configuration, airflow 68 can be circulated inside hollow passages 69 of the nodes 92 and the branches 94 to cool the component 50 in the space between the walls 82, 84 (see FIG. 3). For example, the "hollow" lattice structure may include multiple continuous hollow spoke cavity passages 69 thru which airflow 68 is passed. The airflow 68 flows from each of the hollow branches 94 and coalesces into the nodes 92, which serve as a plenum for the airflow 68 to be redistributed to the next set of hollow branches 94 and nodes 92. The "hollow" lattice structure forms multiple circuitous continuous passages in which the airflow 68 flows to maximize the internal convective cooling surface area and coolant mixing. Additionally, airflow 68 could be communicated over and around the nodes 92 and branches 94 of the vascular engineered lattice structure 80.

The nodes 92 and the branches 94 additionally act as structural members that can be tailored to "tune" steady and unsteady airfoil vibration responses in order to resist and optimally manage steady and unsteady pressure forces, centrifugal bending and curling stresses, as well as provide for improved airfoil local and section average creep and untwist characteristics and capability. In one embodiment, one or more of the nodes 92 and branches 94 may include augmentation features 95 (shown schematically in FIG. 4) that augment the heat transfer effect of the airflow 68 as it is communicated through the vascular engineered lattice structure 80. The augmentation features 95 can also be made using the additive manufacturing processes describe above.

As mentioned above, the vascular arrangement of the vascular engineered lattice structure 80 can be tailored to the specific cooling and structural needs of any given gas turbine engine component. For example, a first portion of the vascular engineered lattice structure 80 can include a different combination of nodes 92, branches 94 and hollow passages 96 compared to a second portion of the vascular engineered lattice structure 80. In one embodiment, a first portion of the vascular engineered lattice structure 80 may include a greater amount of cooling area whereas a second portion of the vascular engineered lattice structure 80 may provide a greater amount of structural area.

Figure 5:
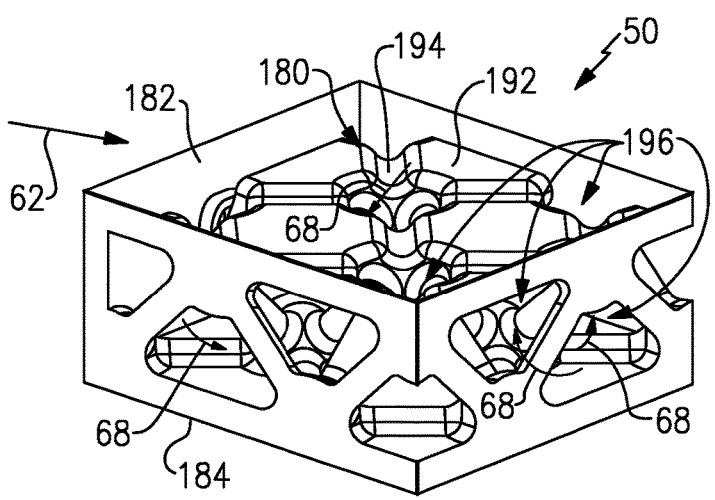
FIG. 5 illustrates another exemplary vascular engineered lattice structure.
Figure 6:
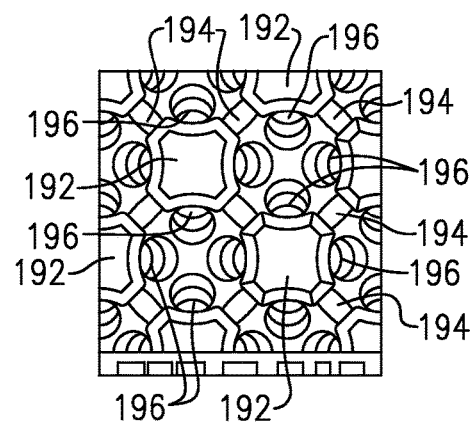
FIG. 6 illustrates another view of the vascular engineered lattice structure of FIG. 5.

FIGS. 5 and 6 illustrate another exemplary vascular engineered lattice structure 180. In this embodiment, the vascular engineered lattice structure 180 embodies a solid lattice structure in which airflow is communicated over and around the solid lattice structure thereby governing flow and providing structural support. The vascular engineered lattice structure 180 is disposed between a first wall 182 and a second wall 184 of the component 50.

The vascular engineered lattice structure 180 includes a plurality of nodes 192, a plurality of branches 194 that extend between the nodes 92, and a plurality of open passages 196 between the branches 194 and the nodes 192. The nodes 192, branches 194 and open passages 196 can be manufactured as a single contiguous structure made of the same material.

In this "solid" lattice structure configuration, airflow 68 can be circulated through the open passages 196 to cool the component 50 in the space between the walls 182, 184. In other words, in contrast to the hollow lattice structure embodiment which communicates airflow through the insides of the nodes 192 and branches 194, the airflow 68 is circulated over and around these parts as part of a porous flow area. For example, the "solid" lattice structure includes multiple continuous solid branches 194 over which airflow 68 is passed. The "solid" lattice structure forms circuitous passages for the airflow 68 to traverse around as it migrates through the vascular engineered lattice structure to maximize the convective cooling surface area and coolant mixing around the nodes 192 and the branches 194. The nodes 192 and the branches 194 additionally act as structural members that resist pressure, rotation forces, and loads.

The exemplary vascular engineered lattice structure 180 establishes a ratio of cooling area to structural area. The cooling area is established by the open passages 196, while the nodes 192 and branches 194 determine the amount of structural area. In one embodiment, the amount of cooling area exceeds the structural area (cooling area>structural area). In another embodiment, a ratio of the cooling area to the structural area is less than 1 (cooling area<structural area). In yet another embodiment, a ratio of the cooling area to the structural area is between 1 and 4. Other configurations are also contemplated.

Figure 7:
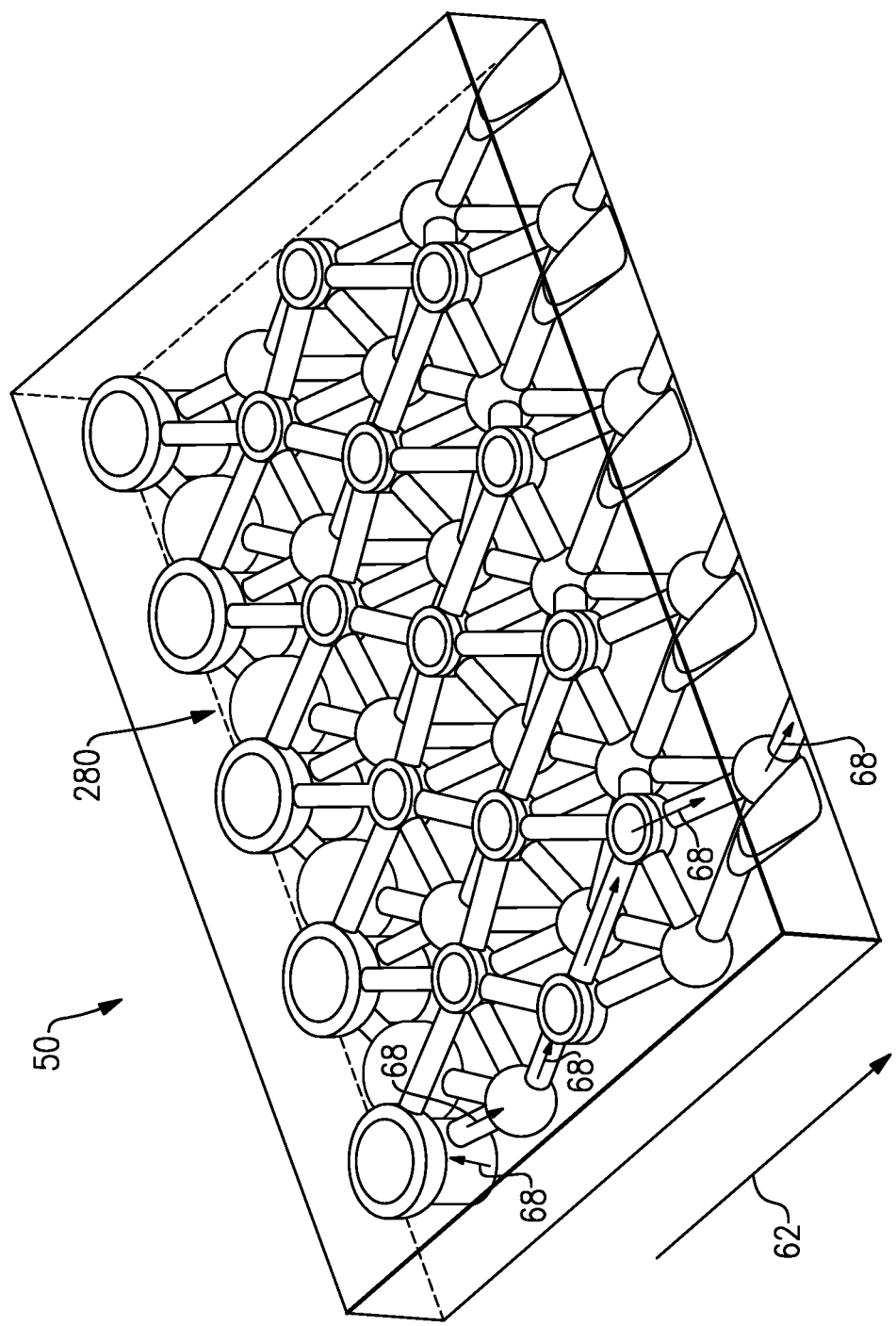
FIG. 7 illustrates another vascular engineered lattice structure embodiment having a co-flow design.

The vascular engineered lattice structures can be configured in either a co-flow or counter-flow heat exchanger design concepts. For example, FIG. 7 depicts a vascular engineered lattice structure 280 providing a co-flow design. In other words, the airflow 68 is circulated through the vascular engineered lattice structure 280 in substantially the same direction as the gas path 62 flow direction. Although a hollow configuration is depicted, a co-flow design could also be incorporated into a "solid" configuration.

Figure 8:
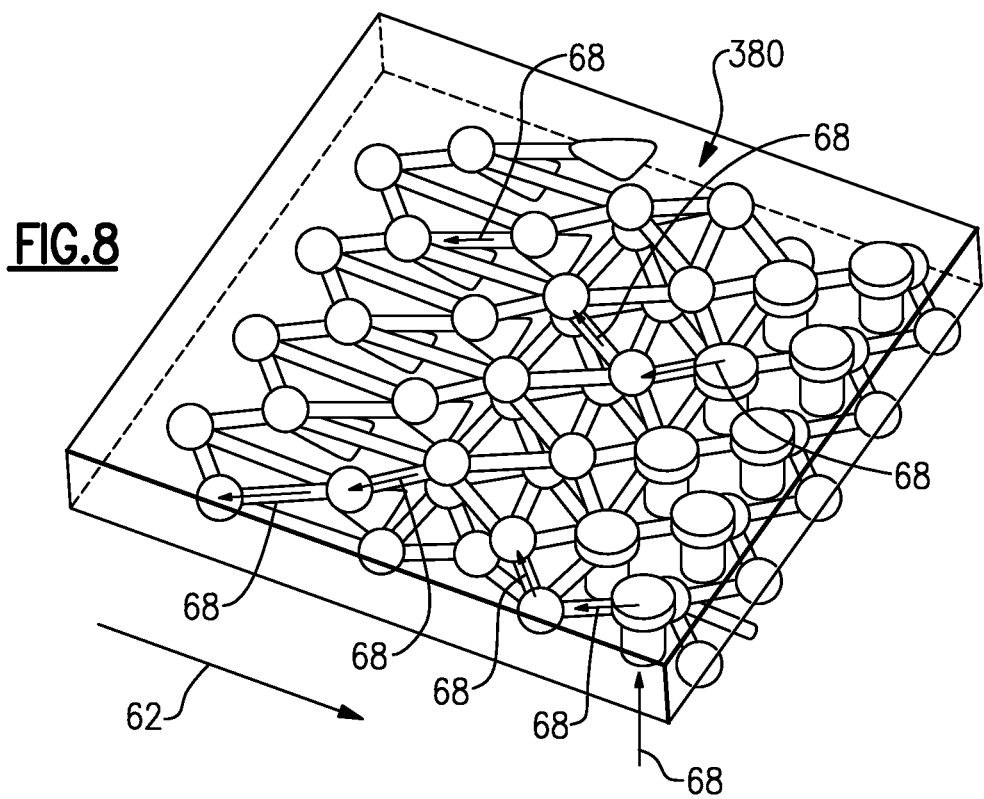
FIG. 8 illustrates another embodiment of a vascular engineered lattice structure embodying a counter-flow design.

FIG. 8 illustrates yet another exemplary vascular engineered lattice structure 380 that could be incorporated into a gas turbine engine component. In this embodiment, the vascular engineered lattice structure 380 provides a counter-flow design. In other words, the airflow 68 is circulated through the vascular engineered lattice structure 380 in a direction that is generally opposite to the flow direction of the gas path 62.

Figure 9:
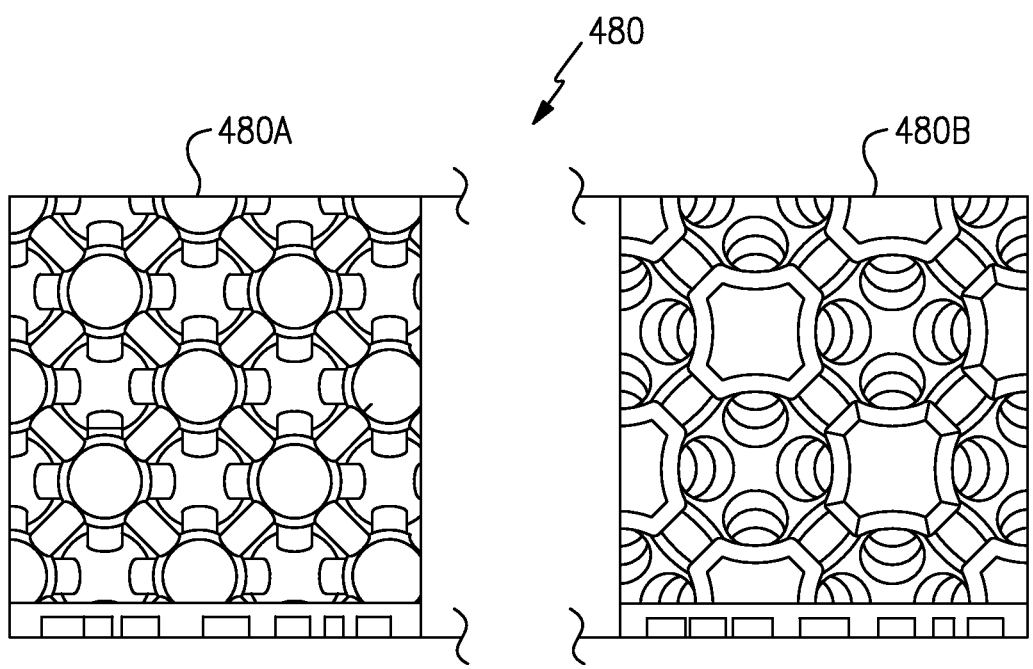
FIG. 9 illustrates yet another exemplary vascular engineered lattice structure.

FIG. 9 illustrates yet another exemplary vascular engineered lattice structure 480 that could be incorporated into a gas turbine engine component. In this embodiment, the vascular engineered lattice structure 480 includes a first portion 480A that can include a hollow lattice structure and a second portion 480B that can include a solid lattice structure. The distribution of interchangeability of the hollow and solid lattice structures is dependent on design requirements and other considerations.

The exemplary vascular engineered lattice structures described in this disclosure may be incorporated into any relatively high heat load gas turbine engine applications where convective cooling is desired. Among other possible design configurations, the vascular engineered lattice structures of this disclosure may be implemented as a co-flow or counter-flow configurations to more efficiently provide localized convective cooling to achieve extended component operating life.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component, comprising:
   a wall;
   a vascular engineered lattice structure formed inside of said wall, with a lattice cavity defined between internal surfaces of said wall and external surfaces of said vascular engineered lattice structure; and
   said vascular engineered lattice structure including at least a hollow vascular structure configured to communicate fluid through said vascular engineered lattice structure, said hollow vascular structure defined by a first set of nodes and a first set of branches each extending from at least one of said first set of nodes, with respective internal passages defined within each node of said first set of nodes and within each branch of said first set of branches for communicating fluid, said internal passages being distinct from said lattice cavity.

2. The component as recited in claim 1, wherein said vascular engineered lattice structure includes a solid vascular structure in which fluid is communicated in said lattice cavity around and over a second set of nodes and a second set of branches of said vascular engineered lattice structure.

3. The component as recited in claim 2, wherein each of said second set of nodes and said second set of branches being free of any internal passages.

4. The component as recited in claim 1, wherein said wall is part of an airfoil, a blade, a vane, a blade outer air seal (BOAS), a combustor panel or a turbine exhaust case of a gas turbine engine.

5. The component as recited in claim 1, wherein said vascular engineered lattice structure is a co-flow vascular engineered lattice structure or a counter-flow vascular engineered lattice structure.

6. The component as recited in claim 1, wherein said vascular engineered lattice structure is formed using an additive manufacturing process.

7. The component as recited in claim 1, wherein said vascular engineered lattice structure is a curved or arcuate structure disposed in a leading edge of said component.

8. The component as recited in claim 1, wherein said vascular engineered lattice structure is an axial jumper vascular engineered lattice structure.

9. The component as recited in claim 1, wherein said vascular engineered lattice structure is a radial flow vascular engineered lattice structure.

10. The component as recited in claim 1, wherein said vascular engineered lattice structure is axially and radially tapered.

11. The component as recited in claim 1, wherein a height of said vascular engineered lattice structure is tapered in a streamwise direction.

12. The component as recited in claim 1, wherein said vascular engineered lattice structure includes at least two separate axial flow vascular engineered lattice structures.

13. The component as recited in claim 1, wherein said wall includes a first wall portion and an opposed, second wall portion, said first wall portion defines external surfaces of said component, said second wall portion bounds an internal cooling cavity, and said lattice cavity is defined between said first wall portion and said second wall portion.

14. The component as recited in claim 13, wherein at least some branches of said first set of branches extend from said internal surfaces of said wall.

15. A method for producing a component, comprising the steps of:
   forming a vascular engineered lattice structure inside of a wall of the component, said vascular engineered lattice structure having at least a hollow lattice structure, with a lattice cavity defined between internal surfaces of said wall and external surfaces of said vascular engineered lattice structure; and
   wherein said hollow lattice structure is defined by a first set of nodes and a first set of branches each extending from at least one of said first set of nodes, with respective internal passages defined within each node of said first set of nodes and within each branch of said first set of branches for communicating fluid, said internal passages being distinct from said lattice cavity.

16. The method as recited in claim 15, wherein the step of forming the vascular engineered lattice structure includes utilizing direct metal laser sintering (DMLS).

17. The method as recited in claim 15, wherein the step of forming the vascular engineered lattice structure includes utilizing electron beam melting (EBM).

18. The method as recited in claim 15, wherein the step of forming the vascular engineered lattice structure includes utilizing select laser sintering (SLS).

19. The method as recited in claim 15, wherein the step of forming the vascular engineered lattice structure includes utilizing select laser melting (SLM).

20. The method as recited in claim 15, comprising the step of:
   communicating fluid inside of said internal passages where the vascular engineered lattice structure embodies the hollow lattice structure.

21. The method as recited in claim 15, wherein the step of forming the vascular engineered lattice structure includes:
   forming a core using an additive manufacturing process; and
   using the core to cast the vascular engineered lattice structure.

22. The method as recited in claim 19, wherein the additive manufacturing process includes powder bed technology and the vascular engineered lattice structure is cast using a lost wax process.

23. The method as recited in claim 15, wherein said vascular engineered lattice structure including a solid lattice structure, and further comprising the step of communicating fluid in said lattice cavity around and over a second set of nodes and a second set of branches of said solid lattice structure, each of said second set of nodes and said second set of branches being free of any internal passages.

* * * * *

UNITED STATES PATENT AND TRADEMARK OFFICE
CERTIFICATE OF CORRECTION

| | | |
|---|---|---|
| PATENT NO. | : 10,570,746 B2 | Page 1 of 1 |
| APPLICATION NO. | : 14/655058 | |
| DATED | : February 25, 2020 | |
| INVENTOR(S) | : Dominic J. Mongillo and Tracy A. Propheter-Hinckley | |

It is certified that error appears in the above-identified patent and that said Letters Patent is hereby corrected as shown below:

In the Claims

In Claim 22, Column 12, Line 45; replace "claim 19" with --claim 21--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*